(12) United States Patent
Shimizu et al.

(10) Patent No.: US 8,779,969 B2
(45) Date of Patent: Jul. 15, 2014

(54) RADAR DEVICE FOR DETECTING AZIMUTH OF TARGET

(75) Inventors: Koji Shimizu, Ichinomiya (JP); Keiji Matsuoka, Kariya (JP)

(73) Assignee: Denso Corporation, Kariya (JP)

( * ) Notice: Subject to any disclaimer, the term of this patent is extended or adjusted under 35 U.S.C. 154(b) by 297 days.

(21) Appl. No.: 13/449,761

(22) Filed: Apr. 18, 2012

(65) Prior Publication Data

US 2012/0268313 A1 Oct. 25, 2012

(30) Foreign Application Priority Data

Apr. 21, 2011 (JP) .................. 2011-094924

(51) Int. Cl.
*G01S 13/08* (2006.01)

(52) U.S. Cl.
USPC .............................. 342/70; 342/106; 342/107

(58) Field of Classification Search
USPC ..................................................... 342/70–72
See application file for complete search history.

(56) References Cited

U.S. PATENT DOCUMENTS

| 2006/0007036 | A1 | 1/2006 | Natsume et al. | |
| 2010/0073216 | A1* | 3/2010 | Sakamoto et al. | 342/70 |
| 2011/0006941 | A1 | 1/2011 | Samukawa et al. | |

FOREIGN PATENT DOCUMENTS

| JP | 2003-185738 | 7/2003 |
| JP | 2006-047282 | 2/2006 |
| JP | 2007-240313 | 9/2007 |
| JP | 2007-303921 | 11/2007 |
| JP | 2010-054344 | 3/2010 |

OTHER PUBLICATIONS

Office Action issued Dec. 5, 2013 in corresponding CN Application No. 201210118782.X (with English translation).

* cited by examiner

*Primary Examiner* — Timothy A Brainard
(74) *Attorney, Agent, or Firm* — Harness, Dickey & Pierce, PLC (57) ABSTRACT

In a radar device, an azimuth estimating module estimates, when there are a plurality of arrival echo and an angular range between the arrival azimuth of one of adjacent arrival echoes in the plurality of arrival echoes and the arrival azimuth of the other thereof is equal to or smaller than a predetermined azimuth resolution of a plurality of receiving antennas, a virtual azimuth and virtual power for each of first frequency components and second frequency components. The virtual azimuth is within the angular range between the arrival azimuth of one of adjacent arrival echoes in the plurality of arrival echoes and the arrival azimuth of the other thereof, and the virtual power is received power of a virtual arrival echo from the virtual azimuth.

4 Claims, 4 Drawing Sheets

RADAR DEVICE FOR DETECTING AZIMUTH OF TARGET

CROSS REFERENCE TO RELATED APPLICATIONS

This application is based on and claims the benefit of priority from Japanese Patent Application 2011-094924 filed on Apr. 21, 2011, the disclosure of which is incorporated in its entirety by reference.

TECHNICAL FIELD

The present disclosure relates generally to radar devices designed to determine information including at least the azimuth (direction) of a target.

BACKGROUND

Radar devices are often used as driving support devices for motor vehicles. FM-CW (Frequency-Modulated Continuous Wave) radar devices are well known as such radar devices.

Typical FM-CW radar devices transmit, as a transmitted signal, a continuous radar wave, which is frequency modulated to have a frequency that increases in an up section over time and decreases in a down section over time; the up and down sections constitute one modulation cycle. The FM-CW radar devices receive, as received signals, arrival echoes (arrival waves) by respective receiving channels of a receiving antenna; the receiving channels are aligned in a row. The echoes are generated by reflection of the radar wave from a target, such as a point of an object that has reflected the radar wave.

The FM-CW radar devices generate, based on the received signals, information associated with the target that has reflected the radar wave. For example, such a typical FM-CW radar device is disclosed in Japanese Patent Application Publication No. 2006-47282.

Specifically, an FM-CW radar device of this type mixes the transmit signal with received signals (received echoes) to generate beat signals. Each of the beat signals has a frequency identical to a difference in frequency between a received signal by a corresponding receiving channel and the transmit signal. The FM-CW radar device performs spectrum analysis of each of the beat signals in each of the up and down sections to obtain peak frequency-components in intensity in each of the up and down sections. Each of the peak frequency-components means that there is a target candidate as the source of a corresponding arrival echo; the peak frequency-components will be referred to as "frequency peaks".

Next, the FM-CW radar device performs one of known azimuth estimation algorithms, in other words, DOA (direction-of-arrival) estimation algorithms, to estimate the azimuth (direction) of an arrival echo, that is, an angle of an arrival echo from a corresponding target candidate with respect to a predetermined reference axis for each frequency peak. Then, the FM-CW radar device estimates the received power of the corresponding echo from the target candidate for each frequency peak.

Thereafter, the FM-CW radar device performs a known "pair-matching" task to extract, from the frequency peaks, at least one pair of a frequency peak in the up section and a corresponding frequency peak in the down section; the frequency peaks of the at least one pair meet both of the following conditions:

The first condition is that the difference in direction between an arrival echo corresponding to one of the frequency peaks of the at least one pair and an arrival echo corresponding to the other is within a predetermined angular range. The second condition is that the difference in received-power between the arrival echo corresponding to one of the frequency peaks of the at least one pair and the arrival echo corresponding to the other is within a predetermined power range.

The FM-CW radar device estimates that the extracted at least one pair of frequency peaks corresponds to at least one same target candidate that has reflected the radar wave.

Thus, the FM-CW radar device calculates the distance and the relative speed between the radar device and the corresponding at least one target candidate based on the at least one extracted pair of frequency peaks. Thus, the FM-CW radar device generates target information including the distance and the relative speed between the radar device and the corresponding at least one target candidate, and the azimuth of the corresponding at least one target candidate.

High resolution algorithms as the azimuth estimation algorithms are known. One of these high resolution algorithms is the MUSIC (Multiple Signal Classification) algorithm, and another is the ESPRIT (Estimation of Signal Parameters via Rotational Invariance Techniques) algorithm.

These high resolution algorithms generate an autocorrelation matrix of the received signals from the respective channels, obtain eigenvalues of the autocorrelation matrix, and estimate the number of arrival echoes based on the eigenvalues of the autocorrelation matrix. Particularly, the MUSIC algorithm obtains a MUSIC spectrum based on the number of arrival echoes and the eigenvalues, and extracts sharp peaks (deep nulls) in the MUSIC spectrum. Then, the MUSIC algorithm estimates the azimuth of a corresponding arrival echo for each extracted sharp peak, and estimates the received power of an arrival echo from the target for each extracted sharp peak.

SUMMARY

Azimuth resolution is known as a measure of azimuth-estimation performance. The azimuth resolution of radar devices set forth above represents a minimum angle between the azimuths of arrival echoes from adjacent targets (adjacent target candidates); the arrival echoes can be completely separated from each other until the actual angle between the adjacent arrival echoes is larger than the azimuth resolution (minimum angle). The azimuth resolution of a radar device is determined based on its hardware performance in addition to its signal-processing performance. The hardware performance of such a radar device depends on, for example, the physical characteristics of the receiving antenna; these physical characteristics of the receiving antenna include, for example, the characteristics of the receiving channels, and the intervals between the receiving channels. The signal-processing performance of such a radar device depends on, for example, one of the azimuth estimation algorithms installed in the radar device.

This may result in reduction of the accuracy of estimating the azimuth and received power of a first arrival echo from a first target candidate and those of a second arrival echo from a second target candidate adjacent to the first target candidate depending on the positional relationship between the first and second target candidates.

Specifically, if the first and second target candidates approached while the difference in the corresponding azimuths of arrival echoes from the first and second target candidates is smaller than the azimuth resolution, the radar device could not completely and stably separate the arrival echoes from the first and second target candidates.

For example, let us assume that one forward vehicle, such as a heavy truck, runs in front of a vehicle in which such a radar device is installed, and the difference in the corresponding arrival echoes from both ends of the rear end portion of the forward vehicle in its width (lateral) direction is with in the azimuth resolution.

In this assumption, the point in the rear end portion of the forward vehicle, such as the left edge, the right edge, and the center of the rear end portion, which has reflected a radar wave emitted from the radar device, may vary between an up section and a down section of one modulation cycle of the radar wave. This means that the target in the forward vehicle for the radar device varies between an up section and a down section of one modulation cycle of the radar wave.

This may cause the number of arrival echoes in the up section and that of arrival echoes in the down section to be different from each other. The difference in the number of arrival echoes between the up and down sections may cause the difference between the azimuths of adjacent arrival echoes from adjacent target candidates corresponding to one frequency peak in, for example, the up section to be smaller than the azimuth resolution.

This may result in the variations in received power between the adjacent arrival echoes from the adjacent target candidates in the up section. For example, a first level of the received power of one of the adjacent arrival echoes may increase with reduction in a second level of the received power of the other although an actual level of each of the adjacent arrival echoes is an average value between the first and second levels of received power of the respective adjacent arrival echoes.

At that time, when an arrival echo from one of the adjacent target candidates (the same target candidates) corresponding to an alternative frequency peak in the down section has the average level of received power, the difference between the first level of received power corresponding to the one frequency peak and the average level of received power corresponding to the alternative frequency peak may exceed the predetermined power range. Similarly, the difference between the second level of received power corresponding to the one frequency peak and the average level of received power corresponding to the alternative frequency peak may exceed the predetermined power range.

Thus, even if the radar device performs the pair-matching method, it may not extract proper pairs of frequency peaks that meet the second condition. This may reduce the reliability of target information generated by the radar device.

In view of the circumstances set forth above, one aspect of the present disclosure seeks to provide radar devices, which are designed to address at least one of the problems set forth above.

Specifically, an alternative aspect of the present disclosure aims to provide such radar devices capable of maintaining, at a high level, the reliability of target information generated by the radar devices.

According to one exemplary aspect of the present disclosure, there is provided a radar device. The radar device includes a transmitter that transmits a radar wave, the radar wave being frequency modulated to have a frequency that increases in an up section over time and decreases in a down section over time. The up and down sections constitute one modulation cycle of the radar wave. The radar device includes a receiver comprising a plurality of receiving antennas each of which receives at least one arrival echo as a received signal. The receiver is configured to output a beat signal for each of the plurality of receiving antennas based on the received signals of the plurality of receiving antennas and a local signal having a frequency identical to the frequency of the transmitted radar wave. The radar device includes a frequency-peak extracting module that performs spectrum analysis on the beat signal for each of the plurality of receiving antennas in each of the up and down sections to extract, from a result of the spectrum analysis for each of the antennas, first frequency components in the up section and second frequency components in the down section. Each of the first frequency components has a local peak in intensity in the up section, and each of the second frequency components has a local peak in intensity in the down section. The radar device includes an azimuth estimating module produces, for each of the first frequency components and the second frequency components, an autocorrelation matrix of the received signals of the respective antennas. The azimuth estimating module estimates, for each of the first frequency components and the second frequency components, a number of the at least one arrival echo based on eigenvalues of the autocorrelation matrix. The azimuth estimating module estimates, for each of the first frequency components and the second frequency components, an arrival azimuth of the at least one arrival echo and received power of the at least one arrival echo as arrival power. The azimuth estimating module estimates a virtual azimuth and virtual power for each of the first frequency components and the second frequency components when the at least one arrival echo is in plurality and an angular range between the arrival azimuth of one of adjacent arrival echoes in the plurality of arrival echoes and the arrival azimuth of the other thereof is equal to or smaller than a predetermined azimuth resolution of the plurality of receiving antennas. The virtual azimuth is within the angular range between the arrival azimuth of one of adjacent arrival echoes in the plurality of arrival echoes and the arrival azimuth of the other thereof, and the virtual power is received power of a virtual arrival echo from the virtual azimuth. The azimuth estimating module produces azimuth information for each of the first frequency components and the second frequency components. The azimuth information includes, for each of the first frequency components and the second frequency components, the arrival azimuth and the arrival power of the at least one arrival echo, and the virtual azimuth and the virtual power.

In a first embodiment of the one exemplary aspect of the present disclosure, the radar device includes a matching module that determines whether the azimuth information for each of the first frequency components is matched with the azimuth information for each of the second frequency components to extract, based on a result of the matching, at least one frequency-component pair of one of the first frequency components and one of the second frequency components. The radar device further includes a target information generating module that calculates, based on the at least one frequency-component pair, a distance and a relative speed between the radar device and a target that corresponds to the at least one frequency-component pair and has reflected the radar wave, and generates target information for the at least one frequency-component pair, the target information including at least one of: the distance between the radar device and the target, the relative speed between the radar device and the target, and an azimuth of the target corresponding to the at least one frequency-component pair.

Specifically, the radar device according to the one exemplary aspect of the present disclosure estimates a virtual azimuth and virtual power for each of the first frequency components and the second frequency components when the angular range between the arrival azimuth of one of adjacent arrival echoes and the arrival azimuth of the other thereof is equal to or smaller than the predetermined azimuth resolution of the plurality of receiving antennas. The virtual azimuth is within the angular range between the arrival azimuth of one of the adjacent arrival echoes and the arrival azimuth of the other thereof, and the virtual power is received power of a virtual arrival echo from the virtual azimuth. This makes it possible to replace azimuth information for each of the first frequency components and the second frequency components with more probable azimuth information therefor when the angular range between the arrival azimuth of one of adjacent arrival echoes and the arrival azimuth of the other thereof is equal to or smaller than the predetermined azimuth resolution of the plurality of receiving antennas.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of an embodiment with reference to the accompanying drawings in which.

DETAILED DESCRIPTION OF EMBODIMENT

An embodiment of the present disclosure will be described hereinafter with reference to the accompanying drawings. In this embodiment, like parts between the embodiments, to which like reference characters are assigned, are omitted or simplified in redundant description.

Figure 1:
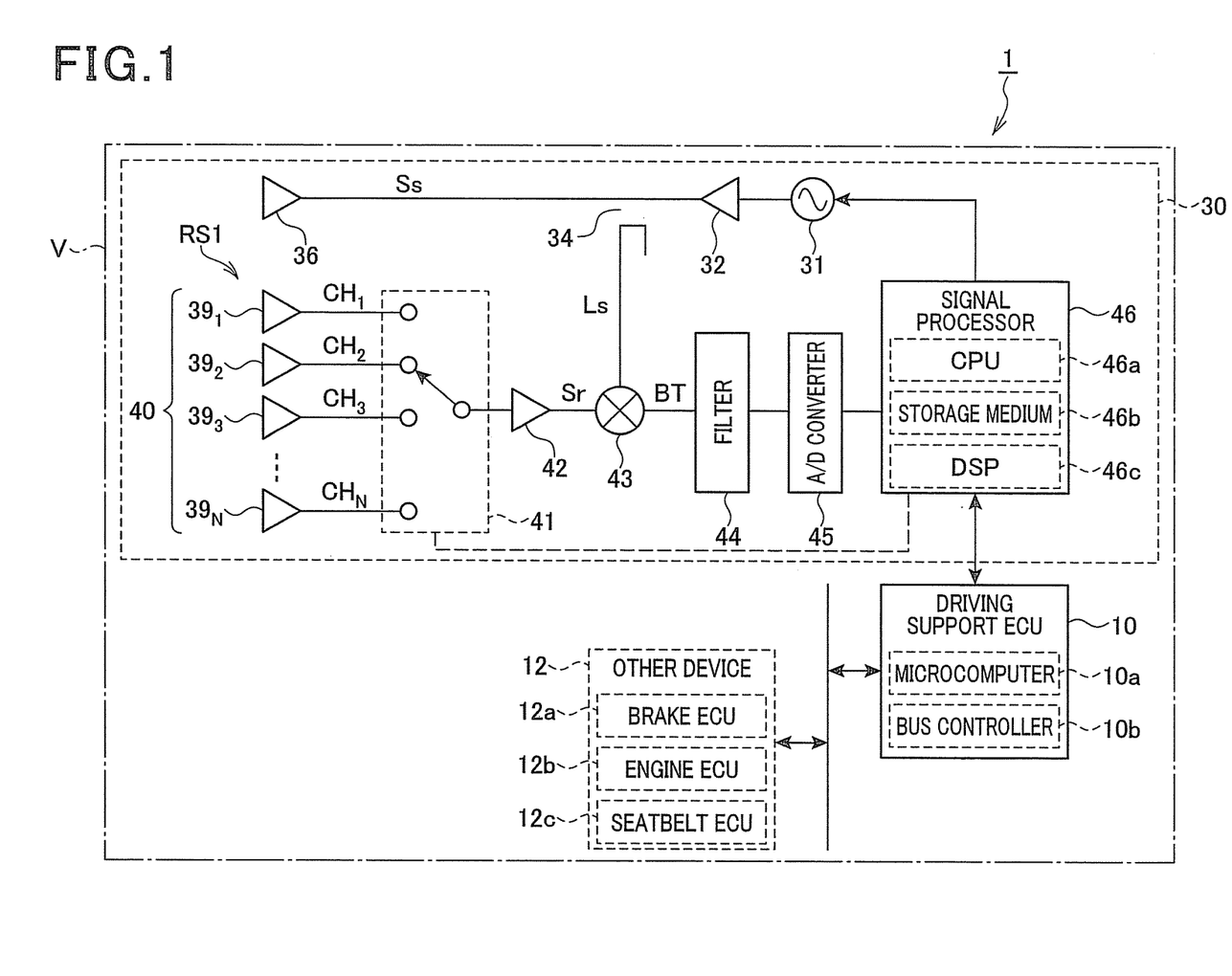
FIG. 1 is a block diagram schematically illustrating a radar device according to an embodiment of the present disclosure.

An example of the overall structure of a driving support system 1 including a radar device according to this embodiment is illustrated in FIG. 1. The driving support system 1 according to this embodiment is installed in a vehicle V and operative to perform driving-support tasks while a driver is driving the vehicle V.

Referring to FIG. 1, the driving support system 1 includes a radar device 30 and a driving-support ECU 10. The radar device 30 is placed on, for example, the front end (head) of a vehicle V. The radar device 30 is operative to transmit a radar wave, receive arrival echoes that are generated by reflection of the radar wave, detect, based on the arrival echoes, a target that has reflected the radar wave, and generate information associated with the target. The information associated with a target that has reflected a radar wave emitted from the radar device 30 will be referred to as "target information". The driving-support ECU 10 is programmed to control the vehicle V based on the target information generated by the radar device 30.

Note that a target in this embodiment represents a point on an object, which has reflected a radar wave emitted from the radar device 30. Normally, one target is detected by the radar device 30 from one object, but plural targets can be detected by the radar device 30 from one object if the one object is big in size, such as a truck. Target information in this embodiment includes at least the distance from the radar device 30 to a detected target, the azimuth (direction) of a detected target with respect to a predetermined axis, such as an axis orthogonal to the receiving surface of the radar device 30, and the relative speed between a detected target and the radar device 30; the azimuth of a detected target represents an incident angle of a corresponding arrival echo from the detected target with respect to the predetermined axis.

The driving-support ECU 10 is made up of, for example, a normal microcomputer 10a equipped with at least a CPU and a storage unit including a volatile memory and a nonvolatile memory, an IO (Input and output) interface, and so on. The driving-support ECU 10 also includes a bus controller 10b that allows the microcomputer 10a to communicate with other devices 12 via a LAN communication bus B; these other devices 12 are connected to the bus B. To the driving-support ECU 10, a warning buzzer, a monitor, a cruise control switch, a target distance setting switch, and so on are connected. As the other devices 12, a brake ECU 12a, an engine ECU 12b, a seatbelt ECU 12c, and the like are connected to the bus B. The brake ECU 12a is operative to control the operations of brakes (brake actuators) provided for respective wheels of the vehicle V, the engine ECU 12b is operative to control the operations of an internal combustion engine of the vehicle V, and the seatbelt ECU 12c is operative to control the tension of seatbelts for occupants in the vehicle V.

Specifically, the driving-support ECU 10 is operative to perform, based on the target information sent from the radar device 30, the driving-support tasks for supporting a driver of the vehicle V while the driver is driving the vehicle V. The driving-support tasks according to this embodiment include an adaptive cruise control task and a precrash task.

The adaptive cruise control task automatically controls the speed of the vehicle V to keep the distance between the vehicle and a forward vehicle ahead of the vehicle V to a target distance; the target distance can be set by the driver using the target distance setting switch. For example, the driving-support ECU 10 is programmed to perform the adaptive cruise control task in cooperation with the engine ECU 12b with the cruise control switch being ON. The driving-support ECU 10 is programmed to cancel the adaptive cruise control task when the cruise control switch is turned OFF, or a brake pedal or a clutch pedal is depressed by the driver.

The precrash task controls the warning buzzer and the monitor to provide audible and/or visible warning to the driver of the vehicle V, controls the brakes to apply full braking to the vehicle V, and/or tightens the seatbelts when the distance between the vehicle and a forward vehicle ahead of the vehicle V is equal to or lower than a preset threshold distance. For example, the driving-support ECU 10 is programmed to perform the precrash task in cooperation with the brake ECU 12a and the seatbelt ECU 12c.

Next, an example of the structure of the radar device 30 will be described hereinafter.

The radar device 30 is designed as, for example, an FM-CW millimeter-wave radar device. Referring to FIG. 1, the radar device 30 is comprised of an oscillator 31, an amplifier 32, a distributor 34, a transmitting antenna 36, and a receiving antenna module (antenna array) 40.

The oscillator 31 is operative to generate, based on, for example, a triangular modulation voltage signal, a millimeter high-frequency signal. The millimeter high-frequency signal is frequency modulated to have a frequency that increases in an up section over time and decreases in a down section over time; the up and down sections constitute one modulation cycle of the millimeter high-frequency signal. That is, the millimeter modulation high-frequency signal is designed as a positively and negatively chirped signal.

The amplifier 32 is operative to amplify the millimeter high-frequency signal generated by the oscillator 31.

The distributor 34 is operative to distribute in power the millimeter high-frequency signal amplified by the amplifier 32 into a positively and negatively chirped transmit signal Ss (see FIG. 3) and a local signal Ls.

The transmitting antenna 36 is operative to radiate a positively and negatively chirped millimeter radio wave based on the transmit signal Ss in front of the vehicle V.

The receiving antenna module 40 is comprised of N antennas $39_1$ to $39_N$ (N is an integer equal to or greater than 2). The antennas $39_1$ to $39_N$ are aligned in a row that is, for example, parallel to the width (horizontal) direction of the vehicle V. Channels $CH_1$ to $CH_N$ are allocated to the antennas $39_1$ to $39_N$, respectively.

The radar device 30 is also comprised of a receiving switch 41, an amplifier 42, a mixer 43, a filter 44, an A/D (Analog-to-Digital) converter 45, and a signal processor (processor) 46. The receiving antenna module 40, the receiving switch 41, the amplifier 42, the mixer 43, the filter 44, and the A/D converter 45 constitute a receiving system RS1 of the radar device 30.

The receiving switch 41 is operative to select one of the antennas $39_1$ to $39_N$ (channels $CH_1$ to $CH_N$) from, for example, the first channel $CH_1$ to the N-th channel $CH_N$ according to a selection control signal supplied from the signal processor 46 to successively supply, to the amplifier 23, received signals Sr sent from the respective selected channels $CH_1$ to $CH_N$. These received signals Sr are generated based on arrival echoes received by the respective selected channels $CH_1$ to $CH_N$. That is, the receiving switch 41 is operative to shift a receiving channel to be selected according to the selection control signal supplied from the signal processor 46.

The amplifier 42 is operative to amplify a received signal Sr supplied from one of the channels $CH_1$ to $CH_N$.

The mixer 43 is operative to mix an amplified received signal Sr corresponding to a selected channel with the distributed local signal L to produce a beat signal BT; the beat signal BT is comprised of a frequency component equivalent to the difference in frequency between the amplified received signal Sr corresponding to a selected channel and the local signal L.

The filter 44 is operative to eliminate undesired signal components from the beat signal BT.

The A/D converter 45 is operative to sample values of the filtered beat signal BT outputted from the filter 44 into digital sampled data (digital sampled values), and output the sampled data to the signal processor 46. Note that the A/D converter 45 can be installed in the signal processor 46.

The signal processor 46 is operative to perform a target recognizing task based on the sampled data of the beat signal BT for each channel, thus detecting one or more targets that have reflected a radar wave emitted from the transmitting antenna 36, and producing target information associated with the detected one or more targets.

For example, the signal processor 46 is comprised of a normal microcomputer consisting essentially of a CPU 46a, a storage medium 46b, and a processor, such as a DSP (Digital Signal Processor) 46c for performing operations of FFT (Fast Fourier transform) on the sampled data of the beat signals BT of the respective receiving channels. The signal processor 46 is communicably connected to the oscillator 11, the switch 41, and the driving support ECU 10.

The CPU 46a of the signal processor 46 is operative to instruct the oscillator 31 to generate a millimeter high-frequency signal, and instruct the oscillator 31 to stop the generation of a millimeter high-frequency signal.

Specifically, a millimeter high-frequency signal generated by the oscillator 31 is amplified by the amplifier 32, and thereafter is inputted to the distributor 34. The millimeter high-frequency signal is distributed by the distributor 34, so that the positively and negatively chirped transmission signal Ss and the local signal L are generated. The positively and negatively chirped transmission signal Ss is transmitted as a positively and negatively chirped millimeter radio wave by the transmitting antenna 36 in front of the vehicle V.

An echo reflected by at least one target based on the transmitted radio wave is returned to the radar device 30 as an arrival echo, and received by each of the antennas (channels) $CH_1$ to $CH_N$ as a received signal Sr. A received signal Sr outputted from a channel $CH_i$ (i=1, 2, or N) currently selected by the receiving switch 41 is amplified by the amplifier 42, and the amplified received signal Sr is supplied to the mixer 43. At the mixer 43, the amplified received signal Sr is mixed with the local signal L, so that a beat signal BT corresponding to the selected channel $CH_i$ is produced. After undesired signal components have been eliminated therefrom by the filter 44, the beat signal BT is sampled by the A/D converter 45 as digital sampled data, and thereafter, the sampled data is captured by the signal processor 46.

The CPU 46a of the signal processor 46 cyclically generates the selection control signal, which causes the receiving switch 41 to repeat a cycle of successive selections of all the channels $CH_1$ to $CH_N$. A preset number, such as 512, of cycles of the successive selections of all the channels $CH_1$ to $CH_N$ are repeated within one modulation cycle of a radar wave transmitted from the radar device 30. That is, each of the channels $CH_1$ to $CH_N$ is selected the preset number of times within one modulation cycle of a radar wave transmitted from the radar device 30. The A/D converter 45 samples a value of the beat signal BT in synchronization with every shift of one channel to another channel of the channels $CH_1$ to $CH_N$. As a result, the sampled data (sampled values) of the beat signal BT for each channel are captured by the signal processor 46 to be stored in the storage medium 46b. The sampled data of the beat signal BT for each channel include sampled data within the up section, and sampled data within the down section.

Figure 2:
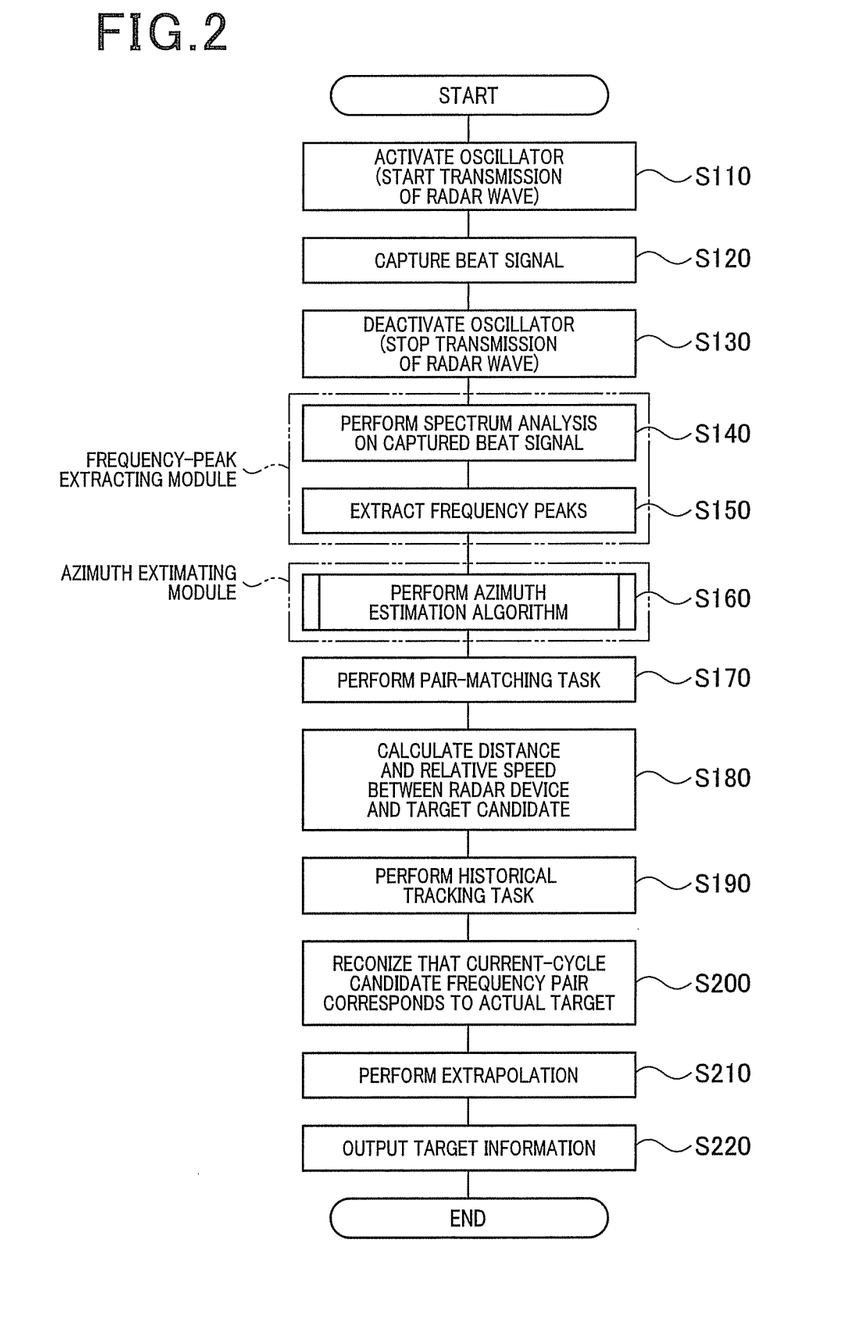
FIG. 2 is a flowchart schematically illustrating a target recognizing task performed by a signal processor illustrated in FIG. 1.

Next, the target recognizing task performed by the CPU 46a of the signal processor 46 in cooperation with the DSP 46c will be described hereinafter with reference to FIG. 2. Specifically, the CPU 46a is designed to launch a target recognizing program stored in the storage medium 46b every measurement cycle, so that the CPU 46a performs the target recognizing task in accordance with the target recognizing program. At least some of the operations of the target recognizing task illustrated in FIG. 2 can be performed by the processor 46c or both of the CPU 46a and the DSP 46c.

In step S110 of the target recognizing task, the CPU 46a activates the oscillator 31 to emit a positively and negatively chirped millimeter radio wave via the transmitting antenna 36 in front of the vehicle V in step S110. Thereafter, the CPU 46a captures sampled data (digital sampled values) of the beat signals BT for the respective channels $CH_1$ to $CH_N$ in step S120, and deactivates the oscillator 31 to stop transmission of the positively and negatively chirped millimeter radio wave when having captured a required number of digital sampled values of the beat signal BT for each of the channels $CH_1$ to $CH_N$ in step S130.

Next, the CPU 46a performs spectrum analysis, that is, an FFT, on the digital sampled values of the beat signal BT for each channel in each of the up and down sections to obtain a power spectrum of the beat signal BT for each channel in each of the up and down sections in step S140. The power spectrum of a beat signal BT demonstrates intensities of frequency components of the beat signal BT.

The CPU 46a extracts, from the power spectrum for each channel, frequency components $fbu_1$ to $fbu_m$ each having a local peak in intensity in the up section, and frequency components $fbd_1$ to $fbd_m$ each having a local peak in intensity in the down section in step S150. Each of the extracted frequency components $fbu_1$ to $fbu_m$ and $fbd_1$ to $fbd_m$ means that there is a target candidate that is the source of a corresponding arrival echo; the extracted frequency components $fbu_1$ to $fbu_m$ and $fbd_1$ to $fbd_m$ will be referred to as "frequency peaks".

Note that the operations by the CPU 46a in steps S140 and S150 serve as a frequency-peak estimating module (see FIG. 2); the frequency-peak estimating module can be designed as a programmed logic module like this embodiment, a hardwired logic module, or hardwired-logic and programmed-logic hybrid module.

Specifically, in step S150, the CPU 46a calculates an arithmetic average of the power spectrums of the beat signals BT for the respective channels $CH_1$ to $CH_N$. Then, the CPU 46a extracts, from the arithmetic average of the power spectrums, frequency components each having an intensity greater than a preset threshold in the up section as the frequency peaks $fbu_1$ to $fbu_m$ in step S150. That is, each of the extracted frequency peaks $fbu_1$ to $fbu_m$ has a local peak in intensity. Similarly, the CPU 46a extracts, from the arithmetic average of the power spectrums, frequency components each having an intensity greater than the preset threshold in the down section as the frequency peaks $fbd_1$ to $fbd_m$ in step S150. That is, each of the extracted frequency peaks $fbd_1$ to $fbd_m$ has a local peak in intensity.

Following the operation in step S150, the CPU 46a performs an azimuth estimation algorithm to estimate the direction (azimuth) of an arrival echo, in other words, an angle of an arrival echo from a corresponding target candidate with respect to the reference axis for each of the frequency peaks $fbu_1$ to $fbu_m$ and $fbd_1$ to $fbd_m$, and estimate the received power of the corresponding arrival echo from the target candidate for each of the frequency peaks $fbu_1$ to $fbu_m$ and $fbd_1$ to $fbd_m$ in step S160.

Thereafter, the CPU 46a performs a known "pair-matching" task to extract, from the frequency peaks $fbu_1$ to $fbu_m$ and $fbd_1$ to $fbd_m$, pairs of frequency peaks in the up section and corresponding frequency peaks in the down section in step S170; the frequency peaks of each pair meet the following conditions:

The first condition is that the difference in direction between arrival echoes corresponding to the frequency peaks of each pair is within a predetermined angular range. The second condition is that the difference in received power between the arrival echoes corresponding to the frequency peaks of each pair is within a predetermined power range. That is, the CPU 46a estimates that each of the pairs of frequency peaks extracted in step S170 corresponds to a same target candidate that has reflected the radar wave transmitted from the radar device 30. In step S170, the CPU 46a registers the pairs of frequency peaks in the storage medium 46b. The pairs of frequency peaks registered in the storage medium 46b will be referred to as "candidate frequency pairs" hereinafter.

Following the operation in step S170, the CPU 46a calculates the distance and the relative speed between the radar device 30 and a target candidate corresponding to each of the candidate frequency pairs in step S180.

For example, the CPU 46a additionally performs the following operations in step S180 according to this embodiment. First, the CPU 46a receives the current speed of the vehicle V from, for example, the engine ECU, and calculates the speed of each of the target candidates based on the relative speed between the vehicle V (the radar device 30) and each of the target candidates and the speed of the vehicle V. Next, the CPU 46a determines whether each of the target candidates is a stationary target or a moving target based on the speed of each of the target candidates.

Third, the CPU 46a creates, in the storage medium 46b, target information representing that: the distance and relative speed between the vehicle V and each target candidate; the speed of each target candidate; information representing whether each target candidate is a stationary target or a moving target; and the azimuth (direction) of each target candidate estimated in step S160. Next, the CPU 46a registers, in the storage medium 46b, the target information such that the target information is correlated with a corresponding one of the candidate frequency pairs.

Note that, as described above, the target recognizing task is repeatedly performed by the CPU 46a every measurement cycle. Thus, when the target info illation is registered in the storage medium 46b by the target recognizing task during a current measurement cycle, the target info illation, which has been obtained in the previous measurement cycle, has been registered in the storage medium 46b.

Thus, after the operations in step S180, the CPU 46a performs a historical tracking task based on the target information correlated with each of the candidate frequency pairs registered in the current measurement cycle and the target information correlated with each of the candidate frequency pairs registered in the previous measurement cycle in step S190. The historical tracking task in step S190 is to detect at least one candidate frequency pair corresponding to a same target candidate. The candidate frequency pairs registered in the current measurement cycle will be referred to as "current-cycle candidate frequency pairs" hereinafter, and the candidate frequency pairs registered in the previous measurement cycle will be referred to as "previous-cycle candidate frequency pairs" hereinafter.

Specifically, the CPU 46a performs the following operations in step S190 according to this embodiment.

First, the CPU 46a obtains all combinations of the current-cycle candidate frequency pairs and the previous-cycle candidate frequency pairs; each of the combinations will be referred to as a "combination frequency-pair group" hereinafter. Next, the CPU 46a extracts one of the combination frequency-pair groups. Then, the CPU 46a obtains, based on the previous-cycle candidate frequency pair of the extracted combination frequency-pair group, a predicted position of a first target candidate corresponding to the previous-cycle candidate frequency pair at which the first target candidate will exists in the current measurement cycle. In addition, the CPU 46a obtains, based on the previous-cycle candidate frequency pair of the extracted combination frequency-pair group, a predicted speed of the first target candidate at which the first target candidate will move in the current measurement cycle. How to obtain the predicted position and predicted speed of a first target candidate is well known. For this reason, the detailed description of it is eliminated. As one typical approach, the CPU 46a predicts the behavior of a first target candidate corresponding to the previous-cycle candidate frequency pair using the Kalman filter (liner quadratic estimation algorithm), and obtains the predicted position and predicted speed of the first target candidate using the predicted results.

Next, the CPU 46a obtains, based on the current-cycle candidate frequency pair of the extracted combination frequency-pair group, a position and a speed of a second target candidate corresponding to the current-cycle candidate frequency pair of the extracted combination frequency-pair group. Thereafter, the CPU 46a calculates the first absolute difference between the predicted position of the first target candidate and that of the second target candidate, and the second absolute difference between the predicted speed of the first target candidate and the speed of the second target candidate.

Next, the CPU 46a determines whether the first absolute difference is shorter than a preset threshold distance and the second absolute difference is lower than a preset upper limit. Only when determining that the first absolute difference is shorter than the preset threshold distance and the second absolute difference is lower than the preset upper limit, the CPU 46a determines that the second target candidate is identical to the first target candidate; in other words, determines that historical tracking of a same target candidate in the extracted combination frequency-pair group is maintained. Then, the CPU 46a updates a count value of a hardware or software counter for the current-cycle candidate frequency pairs of the extracted combination frequency-pair group to a value that is the sum of 1 and the count value of a hardware or software counter for the previous-cycle candidate frequency pairs of the extracted combination frequency-pair group.

Otherwise, when determining that either the first absolute difference is equal to or longer than the preset threshold distance or the second absolute difference is equal to or higher than the preset upper limit, the CPU 46a determines that the second target candidate is different from the first target candidate, in other words, determines that historical tracking of a same target candidate in the extracted combination frequency-pair group is interrupted. Then, the CPU 46a maintains the count value of the counter for the current-cycle candidate frequency pair of the extracted combination frequency-pair group to the count value of the counter for the previous-cycle candidate frequency pair of the extracted combination frequency-pair group.

The CPU 46a carries out these operations for each of the combination frequency-pair groups.

That is, the historical tracking task according to this embodiment is that:

a current-cycle candidate frequency pair that tracks the history of a corresponding previous frequency pair takes over information of the previous-cycle candidate frequency pair, that is the count value of the counter for the previous-cycle candidate frequency pair; and a current-cycle candidate frequency pair that interrupts the history of a corresponding previous frequency pair maintains the count value of the counter for the previous-cycle candidate frequency pair.

As described above, the target recognizing task is repeatedly performed by the CPU 46a every measurement cycle. Therefore, the counter for a current-cycle candidate frequency pair of one combination frequency-pair group in a current measurement cycle is replaced as the counter for a previous-cycle candidate frequency pair of the one combination frequency-pair group in the previous measurement cycle when the target recognizing task in the next measurement cycle is carried out.

Thus, after a given number of the target recognizing task has been carried out, if the count value of a current-cycle candidate frequency pair of one combination frequency-pair group in a current measurement cycle is equal to or higher than a preset recognition threshold, the CPU 46a recognizes that the current-cycle candidate frequency pair corresponds to an actual target, and registers it in the storage medium 46b in step S200.

Following step S200, the CPU 46a performs known extrapolation to continuously register, in the storage medium 46b, at least one current-cycle candidate frequency pair, which has been determined to interrupt the history of a corresponding previous frequency pair in step S190, if an elapsed time of the at least one current-cycle candidate frequency pair since the interruption is within a preset extrapolation period in step S210. In step S210, if an elapsed time for at least one current-cycle candidate frequency pair since the interruption exceeds the preset extrapolation period, the CPU 46a removes the registration of the at least one current-cycle candidate frequency pair. Because extrapolation in the target recognizing task is well-known, additional descriptions therefor are omitted.

Following step S210, the CPU 46a outputs, to the driving-support ECU 10, the target information of at least one target registered in the storage medium 46b in step S220. Note that, in step S220, the direction of arrival of an arrival echo from the at least one target registered in the storage medium 46b included in the target information corresponds to the direction of arrival of an arrival echo from a corresponding at least one target candidate estimated in step S160.

As a result, the driving-support ECU 10 performs, based on the target information outputted from the CPU 46a, the driving-support tasks for supporting the driver of the vehicle V set forth above.

After the operation in step S220, the CPU 46a terminates the target recognizing task, and waits for the next measurement cycle.

Figure 3:
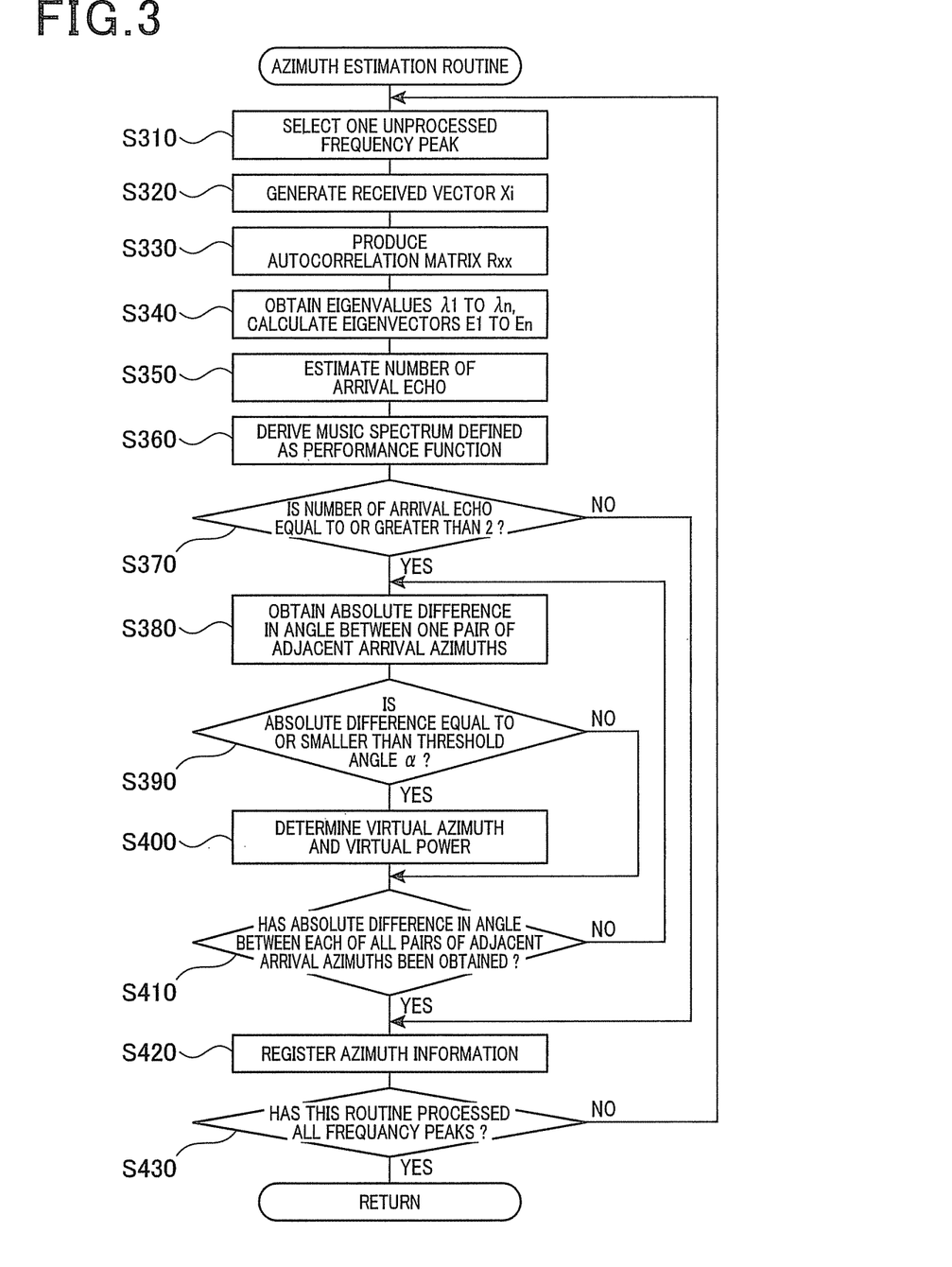
FIG. 3 is a flowchart schematically illustrating an azimuth estimation routine performed by the signal processor in step S160 of the target recognizing task.

Next, an azimuth estimation routine based on an azimuth estimation algorithm performed by the CPU 46a in step S160 will be fully described hereinafter with reference to FIG. 3. In this embodiment, as the azimuth estimation algorithm, the MUSIC algorithm is used.

When the azimuth estimation routine corresponding to the azimuth estimation algorithm is called in step S160 of the target recognizing task, the CPU 46a selects one frequency peak in the frequency peaks $fbu_1$ to $fbu_m$ and $fbd_1$ to $fbd_m$; the selected frequency peak has not been subjected to the following operations in the azimuth estimation routine in step S310.

Next, the CPU 46a extracts, from the power spectrums of the beat signals BT for all the channels $CH_1$ to $CH_N$, signal components of the selected frequency peak, and aligns the selected signal components to thereby produce a received vector Xi(k) as expressed by the following equation (1) in step S320:

$$Xi(k) = [x_1(k), x_2(k), \ldots, x_i(k),]^T \quad (1)$$

where T represents transpose of vector, and $x_{i(k)}$ $_{(i=1, 2, \ldots, N)}$ represents the signal components of the respective channels $CH_1$ to $CH_N$ at time k.

Note that, for production of the received vector Xi(k), a plurality of nulls, that is, zero values can be added to the received vector Xi(k) as virtual data.

Next, the CPU 46a produces, based on the produced received vector Xi(k), an autocorrelation matrix Rxx(k) with N rows and N columns expressed as the following equation (2) in step S330:

$$Rxx(k)=Xi(k)Xi^H(k) \qquad (2)$$

where H represents transpose of complex conjugate.

Next, the CPU 46a obtains N eigenvalues $\lambda_1, \lambda_2, \ldots, \lambda_N$ of the autocorrelation matrix Rxx such that they meet the equation "$\lambda_1 \geq \lambda_2 \geq \ldots \geq \lambda_N$", and calculates eigenvectors $E_1, E, \ldots, E_N$ corresponding to the respective eigenvalues $\lambda_1, \lambda_2, \ldots, \lambda_N$ in step S340.

Next, the CPU 46a estimates, in the eigenvalues $\lambda_1, \lambda_2, \ldots, \lambda_N$, a number of eigenvalues that is equal to or lower than a predetermined threshold Th as a number L of at least one arrival echo received by the channels $CH_1$ to $CH_N$ in step S350; the L is defined to be lower the number N. Because various approaches for estimating the number L of at least one arrival echo are well known, detailed descriptions of how to estimate the number L of at least one arrival echo are eliminated in this embodiment.

For example, the CPU 46a according to this embodiment uses one example of these approaches to define, as the threshold Th, a value corresponding to thermal noise power.

Next, the CPU 46a defines a noise vector $E_{NO}$ consisting of eigenvectors $e_{L+1}, e_{L+2}, \ldots, e_{L+N}$ corresponding to the (N-L) eigenvalues $\lambda_{L+1}, \lambda_{L+2}, \ldots, \lambda_{L+N}$ whose number is equal to or lower than the threshold Th in accordance with the following equation (3) in step S360:

$$E_{NO}=(e_{L+1}, e_{L+2}, \ldots, e_{L+N}) \qquad (3)$$

When a complex response vector of the antenna array (antenna module) 40 with respect to an azimuth parameter $\theta$ is defined as a steering vector $a(\theta)$, the following equation (3a) is established:

$$a^H(\theta)E_N=0 \qquad (3a)$$

Note that the azimuth parameter $\theta$ represents an incident angle of an arrival echo with respect to the axis orthogonal to the receiving surface of the antenna module 40.

The equation (3a) represents that the noise eigenvector $E_{NO}$ is orthogonal to the steering vector $a(\theta)$ when the steering vector $a(\theta)$ is directed to the azimuth of the arrival echoes.

From the equation (3a), the CPU 46a derives a MUSIC spectrum, which is defined as "performance function $P_{MU}(\theta)$" given by the following equation (4) in step S360:

$$P_{MU}(\theta) = \frac{1}{\sum_{t=L+1}^{N} |e_t^H a(\theta)|^2} \times a^H(\theta)a(\theta) \qquad (4)$$

$$= \frac{a^H(\theta)a(\theta)}{a^H(\theta)E_{NO}E_{NO}^H a(\theta)}$$

The MUSIC spectrum obtained by the performance function $P_{MU}(\theta)$ defined by the equation (4) demonstrates that at least one sharper (deeper) peak at a corresponding null appears when a corresponding at least one azimuth of the azimuth parameter $\theta$ is in agreement with the azimuth of at least one arrival echo.

Thus, the CPU 46a obtains at least one estimated azimuth $\theta_1, \ldots, \theta_L$ of at least one arrival echo, that is, at least one estimated azimuth of at least one target candidate that causes the at least one arrival echo by detecting the at least one peak of the MUSIC spectrum in step S360.

Note that, in step S360 according to this embodiment, a value of the MUSIC spectrum at the at least one arrival azimuth $\theta_1, \ldots, \theta_L$ is obtained as the received power in the at least one arrival azimuth $\theta_1, \ldots, \theta_L$ as arrival power.

Next, the CPU 46a determines whether the number L of at least one arrival echo is equal to or greater than 2 in step S370. When determining that the number L of at least one arrival echo is equal to or greater than 2, that is, the number L of at least one arrival echo is plural (YES in step S370), the CPU 46a obtains the absolute difference in angle between one pair of adjacent arrival azimuths in the plural arrival azimuths $\theta_1, \ldots, \theta_L$ in step S380. Otherwise, when determining that the number L of arrival echoes is smaller than 2, that is, the number L of at least one arrival echo is singular (NO in step S370), the CPU 46a goes to step S420.

Following step S380, the CPU 46a determines whether the absolute difference in angle between the one pair of adjacent arrival azimuths is equal to or smaller than a preset threshold angle $\alpha$ in step S390.

Note that the threshold angle $\alpha$ is defined as the azimuth resolution that represents a minimum angle between adjacent azimuths of adjacent arrival echoes; the adjacent arrival echoes can be completely separated from each other until the actual angle therebetween is larger than the azimuth resolution (minimum angle). The azimuth resolution of the radar device 30 is determined based on its hardware performance in addition its signal-processing performance that are well known in this art. The hardware performance of the radar device 30 depends on, for example, the characteristics of the receiving antennas $39_1$ to $39_N$ (channels $CH_1$ to $CH_N$) of the receiving antenna module 40, the intervals between the receiving antennas $39_1$ to $39_N$ (channels $CH_1$ to $CH_N$), and the like.

Figure 4:
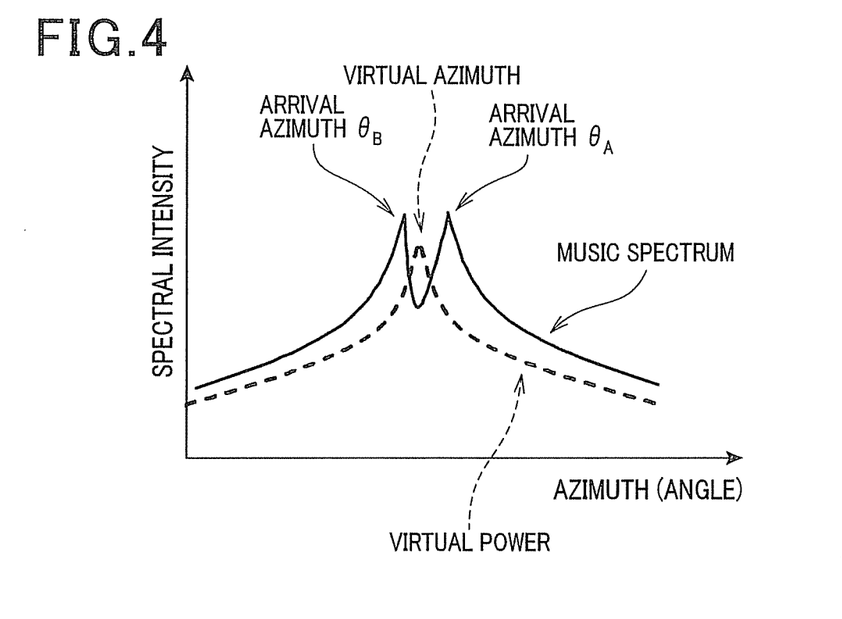
FIG. 4 is a graph schematically illustrating adjacent arrival azimuths, their received power, a virtual azimuth and virtual power as spectral intensity based on the adjacent arrival azimuths in a MUSIC spectrum according to this embodiment; these power are plotted as spectral intensity (dB), and these arrival azimuths are plotted as angles (degrees)

When determining that the absolute difference in angle between the one pair of adjacent arrival azimuths is equal to or smaller than the preset threshold angle $\alpha$ (YES in step S390), the CPU 46a determines an angle (azimuth), such as an intermediate angle, between the adjacent arrival azimuths of the one pair as a virtual azimuth in step S400. For example, as illustrated in FIG. 4, when the adjacent arrival azimuths of the one pair are represented as $\theta_A$ and $\theta_B$ in the MUSIC spectrum, the virtual azimuth is located within the angular range of the adjacent arrival azimuth $\theta_A$ and $\theta_B$.

In step S400, the CPU 46a also estimates power of a virtual arrival echo as virtual power assuming that the radar device 30 receives the virtual arrival echo from the virtual azimuth. For example, in step S400, the CPU 46a obtains received power by the receiving system RS1 as the virtual power when controlling, for example, the phases and/or the amplitudes of the received signals of the channels $CH_1$ to $CH_N$ so that the receive-beam pattern (sensitive pattern) of the antenna array 40 is oriented to the virtual azimuth (see FIG. 4). Note that, in step S400, the CPU 46a can estimate the virtual power at the virtual azimuth using the operations in step S360 set forth above. Thereafter, the CPU 46a proceeds to step S410.

Otherwise, when determining that the absolute difference in angle between the one pair of adjacent arrival azimuths is larger than the preset threshold angle $\alpha$ (NO in step S390), the CPU 46a proceeds to step S410 while skipping the operation in step S400 because of there being no need to estimate a virtual azimuth and virtual power.

In step S410, the CPU 46a determines whether the absolute difference in angle between each of all pairs of adjacent arrival azimuths in the arrival azimuths $\theta_1, \ldots, \theta_L$ has been obtained in step S380 and whether the operations in steps S390 and S400 have been performed for the absolute difference in angle between each of all pairs of adjacent arrival azimuths in the arrival azimuths $\theta_1, \ldots, \theta_L$.

When determining that the absolute difference in angle between each of all pairs of adjacent arrival azimuths in the arrival azimuths $\theta_1, \ldots, \theta_L$ has not been obtained, so that the operations in steps S390 and S400 for the absolute difference in angle between each of all pairs of adjacent arrival azimuths in the arrival azimuths $\theta_1, \ldots, \theta_L$ have not been performed yet (NO in step S410), the CPU 46a returns to step S380. Then, the CPU 46a repeats the operations in steps S380 to S410 until it has performed the operations in steps S390 and S400 for the absolute difference in angle between each of all pairs of adjacent arrival azimuths in the arrival azimuths $\theta_1, \ldots, \theta_L$.

Specifically, when determining that the absolute difference in angle between each of all pairs of adjacent arrival azimuths in the arrival azimuths $\theta_1, \ldots, \theta_L$ has not been obtained (NO in step S410), the CPU 46a obtains the absolute difference in angle between another pair of adjacent arrival azimuths in the arrival azimuths $\theta_1, \ldots, \theta_L$, and performs the operations in steps S390 and S400 for the obtained absolute difference.

Thereafter, when determining that the absolute difference in angle between each of all pairs of adjacent arrival azimuths in the arrival azimuths $\theta_1, \ldots, \theta_L$ has been obtained, so that the operations in steps S390 and S400 for the absolute difference in angle between each of all pairs of adjacent arrival azimuths in the arrival azimuths $\theta_1, \ldots, \theta_L$ have been performed (YES in step S410), the CPU 46a proceeds to step S420.

In step S420, the CPU 46a registers, in the storage medium 46b, azimuth information.

Specifically, when it is determined that the number L of at least one arrival echo is singular (NO in step S370), the estimated arrival azimuth $\theta_{L=1}$ of the single arrival echo and the arrival power of the single arrival echo in the arrival azimuth $\theta_{L=1}$, which have been obtained in step S360, are registered as azimuth information in correlation with the selected frequency peak in the storage medium 42b in step S420.

Otherwise, when it is determined that the number L of at least one arrival echo is plural (YES in step S370), and that the absolute difference in angle between each of all pairs of adjacent arrival azimuths in the arrival azimuths $\theta_1, \ldots, \theta_L$ is larger than the preset threshold angle $\alpha$ (NO in step S390), the estimated arrival azimuths $\theta_1, \ldots, \theta_L$ of the arrival echoes and the arrival power of each of the arrival echoes, which have been obtained in step S360, are registered as azimuth information in correlation with the selected frequency peak in the storage medium 42b in step S420.

On the other hand, when it is determined that the number L of at least one arrival echo is plural (YES in step S370), and that the absolute difference in angle between at least one pair of adjacent arrival azimuths in the arrival azimuths $\theta_1, \ldots, \theta_L$ is equal to or smaller than the preset threshold angle $\alpha$ (YES in step S390), the virtual arrival azimuth and the virtual arrival power estimated in step S400 are registered as azimuth information in correlation with the selected frequency peak in the storage medium 42b in addition to the estimated arrival azimuths $\theta_1, \ldots, \theta_L$ of the arrival echoes and the arrival power of each of the arrival echoes for the selected frequency peak in step S420.

Next, the CPU 46a determines whether the operations in steps S310 to S420 have been completed for all of the frequency peaks $fbu_1$ to $fbu_m$ and $fbd_1$ to $fbd_m$ in step S430.

When determining that the operations in steps S310 to S420 have not been completed for all of the frequency peaks $fbu_1$ to $fbu_m$ and $fbd_1$ to $fbd_m$ (NO in step S430), the CPU 46a returns to step S310, and selects, in step S310, another frequency peak in the frequency peaks $fbu_1$ to $fbu_m$ and $fbd_1$ to $fbd_m$; the selected frequency peak having not been processed by the operations in steps S320 to S420.

Otherwise, when determining that the operations in steps S310 to S420 have been completed for all of the frequency peaks $fbu_1$ to $fbu_m$ and $fbd_1$ to $fbd_m$ (YES in step S430), the CPU 46a terminates the azimuth estimation routine in step S160, returning to step S170 of the target recognizing task.

Note that the operation by the CPU 46a in step S160 (steps S310 to S420) serves as an azimuth estimating module (see FIG. 2); the azimuth estimating module, which is operatively communicable with the frequency-peak extracting module, can be designed as a programmed logic module like this embodiment, a hardwired logic module, or hardwired-logic and programmed-logic hybrid module.

As described above, the radar device 30 according to this embodiment is configured to determine an angle (azimuth), such as an intermediate angle, between the adjacent arrival azimuths of the at least one pair as a virtual azimuth when the absolute difference in angle between at least one pair of adjacent arrival azimuths in the plural arrival azimuths $\theta_1, \ldots, \theta_L$ for one frequency peak is equal to or smaller than the preset threshold $\alpha$. The radar device 30 is also configured to estimate power of an arrival echo as virtual power assuming that the radar device 30 receives the arrival echo from the virtual azimuth. The radar device 30 is further configured to register the virtual azimuth and virtual power in the storage medium 42b in correlation with the corresponding one frequency peak as a part of azimuth information including the estimated arrival azimuths $\theta_1, \ldots, \theta_L$ of the arrival echoes and the arrival power of each of the arrival echoes.

If an angular range between adjacent arrival azimuths in the plural arrival azimuths $\theta_1, \ldots, \theta_L$ for the one frequency peak is equal to or smaller than the azimuth threshold, that is, adjacent arrival echoes corresponding to the adjacent arrival azimuths for the one frequency peak cannot be completely separated, the radar device 30 obtains the virtual azimuth and virtual power of an arrival echo for the one frequency peak in step S160 as more reliable azimuth information.

That is, because the adjacent arrival echoes for the one frequency peak cannot be completely separated from each other, the received power of one of the adjacent arrival echoes in, for example, the up section for the one frequency peak may vary from the received power of the other in the up section for the one frequency peak. At that time, when an arrival echo from one of the adjacent target candidates (the same target candidates) for an alternative frequency peak in the down section has the average level of received power, the difference between the received power for the one frequency peak and the average level of received power for the alternative frequency peak may exceed the predetermined power range.

However, in this case, the radar device 30 obtains the virtual azimuth and virtual power of an arrival echo for a new frequency peak; the virtual azimuth is an azimuth between the adjacent arrival azimuths of the adjacent arrival echoes, and the virtual power of an arrival echo obtained assuming that the radar device receives the arrival echo from the virtual azimuth. This allows the virtual power of an arrival echo for the new frequency peak to be set to a level, such as an average level, between the received power of one of the adjacent arrival echoes and the received power of the other. Thus, even if an arrival echo from one of the adjacent target candidates (the same target candidates) for an alternative frequency peak in the down section has the average level of received power, the radar device 30 performs the pair-matching task, thus generating a pair of the new frequency peak in the up section and the alternative frequency peak in the down section as a candidate frequency pair.

That is, the radar device 30 according to this embodiment makes it possible to properly perform the pair-matching task based on first azimuth infatuation from a target candidate in the up section and second azimuth information from the same target candidate in the down section even if the first azimuth information is different from the second azimuth information to extract a proper candidate frequency pair of a first frequency peak from the first azimuth information and a second frequency peak from the second azimuth information. Thus, it is possible to maintain, at a high level, the reliability of target information obtained by the radar device 30 based on the pair-matching task.

The present disclosure is not limited to the aforementioned embodiment, and therefore can be modified or altered within its scope.

For example, the CPU 46a registers the virtual arrival azimuth and the virtual arrival power estimated in step S400 in the storage medium 42b in correlation with a new frequency peak in addition to the estimated arrival azimuths $\theta_1, \ldots, \theta_L$ of the arrival echoes and the arrival power of each of the arrival echoes for the selected frequency peak in step S420. However, the present disclosure is not limited to the registering operation. Specifically, the CPU 46a can register the virtual arrival azimuth and the virtual arrival power estimated in step S400 in the storage medium 42b in correlation with the selected frequency peak in step S420.

The CPU 46a performs the azimuth estimation routine based on the MUSIC algorithm as an azimuth estimation algorithm, but can perform an azimuth estimation routine based on another azimuth estimation algorithm, such as the ESPRIT algorithm. The ESPRIT algorithm uses two sub-antenna arrays of the antenna array 40; each of the sub-antenna array has the same number of channels. The ESPRIT algorithm estimates the arrival azimuths of arrival echoes received by the sub-antenna arrays based on the differences in phase between the echoes received by one of the sub-array antennas and the other thereof using the number of arrival echoes estimated in the same manner as the MUSIC algorithm.

Specifically, the CPU 46a can use one of various azimuth estimation algorithms as long as they are designed to: generate an autocorrelation matrix of the received signals from the respective channels $CH_1$ to $CH_N$; obtain eigenvalues of the autocorrelation matrix; estimate the number of arrival echoes based on the eigenvalues of the autocorrelation matrix; and estimate the azimuth and received power of each of the arrival echoes.

The radar device 30 according to this embodiment includes the receiving system comprised of the receiving antenna module 40, the receiving switch 41, the amplifier 42, the mixer 43, the filter 44, and the A/D converter 45, but the receiving system according to the present disclosure is not limited to the configuration.

Figure 5:
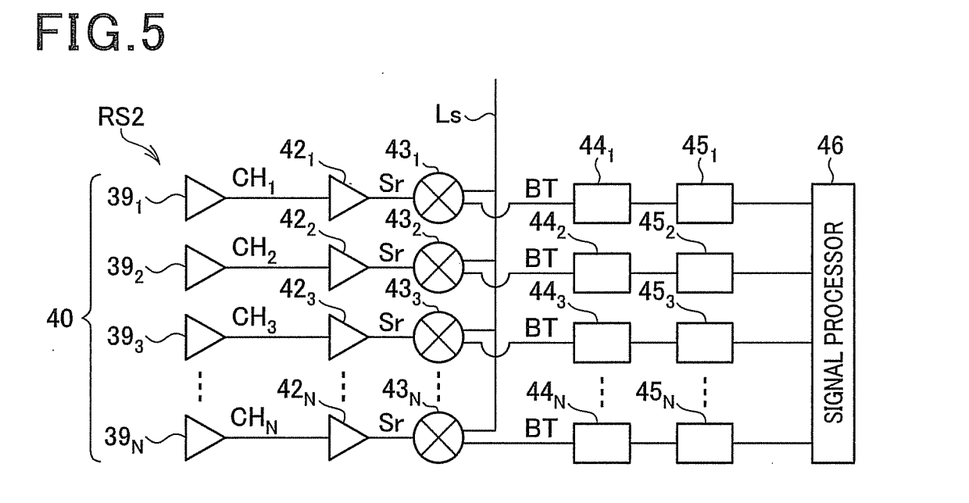
FIG. 5 is a block diagram schematically illustrating a modified receiving system of a radar device according to a modification of this embodiment of the present disclosure.

Specifically, a modified receiving system RS2 of the radar device 30 is illustrated in FIG. 5. Referring to FIG. 5, the modified receiving system RS2 is designed without the receiving switch 41 illustrated in FIG. 1. Specifically, the modified receiving system RS2 is comprised of the receiving antenna module 40 (the antennas $39_1$ to $39_N$), N amplifiers $42_1$ to $42_N$, N mixers $43_1$ to $43_N$, N filters $44_1$ to $44_N$, and N A/D converters $45_1$ to $45_N$.

The amplifiers $42_1$ to $42_N$ are designed to amplify received signals Sr supplied from the respective channels $CH_1$ to $CH_N$.

The mixers $43_1$ to $43_N$ are operative to mix the received signals Sr amplified by the respective amplifiers $42_1$ to $42_N$ with the distributed local signal L to produce beat signals BT; each of the beat signals BT is comprised of a frequency component equivalent to the difference in frequency between a corresponding amplified received signal Sr and the local signal L.

The filters $44_1$ to $44_N$ are operative to eliminate undesired signal components from the respective beat signals BT.

Each of the A/D converters $45_1$ to $45_N$ is operative to sample values of a filtered beat signal BT outputted from a corresponding one of the filters $44_1$ to $44_N$ into digital sampled data (digital sampled values), and output the sampled data to the signal processor 46. Note that the A/D converters $45_1$ to $45_N$ can be installed in the signal processor 46.

As a specific example of the present disclosure, a radar device (30) includes:

a set of an oscillator 31, an amplifier 32, a distributor 34, and a transmitting antenna 36, which transmits a radar wave, the radar wave being frequency modulated to have a frequency that increases in an up section over time and decreases in a down section over time, the up and down sections constituting one modulation cycle of the radar wave;

a receiving system RS1 including a plurality of receiving antennas $39_1$ to $39_N$ each of which receives at least one arrival echo as a received signal, the receiver being configured to output a beat signal for each of the plurality of receiving antennas based on the received signals of the plurality of receiving antennas and a local signal having a frequency identical to the frequency of the radar wave; and a signal processor 46 (operations by a CPU 46a in steps S140 and S150) that performs spectrum analysis on the beat signal for each of the plurality of receiving antennas in each of the up and down sections to extract, from a result of the spectrum analysis for each of the antennas, first frequency components in the up section and second frequency components in the down section, each of the first frequency components having a local peak in intensity in the up section, each of the second frequency components having a local peak in intensity in the down section; the signal processor 46 (an operation by the CPU 46a in step S160) is configured to:

produce, for each of the first frequency components and the second frequency components, an autocorrelation matrix of the received signals of the respective antennas;

estimate, for each of the first frequency components and the second frequency components, a number of the at least one arrival echo based on eigenvalues of the autocorrelation matrix;

estimate, for each of the first frequency components and the second frequency components, an arrival azimuth of the at least one arrival echo and received power of the at least one arrival echo as arrival power;

estimate a virtual azimuth and virtual power for each of the first frequency components and the second frequency components when the at least one arrival echo is in plurality and an angular range between the arrival azimuth of one of adjacent arrival echoes in the plurality of arrival echoes and the arrival azimuth of the other thereof is equal to or smaller than a predetermined azimuth resolution of the plurality of receiving antennas, the virtual azimuth being within the angular range between the arrival azimuth of one of adjacent arrival echoes in the plurality of arrival echoes and the arrival azimuth of the other thereof, the virtual power being received power of a virtual arrival echo from the virtual azimuth; and produce azimuth information for each of the first frequency components and the second frequency components, the azimuth information including, for each of the first frequency components and the second frequency components, the arrival azimuth and the arrival power of the at least one arrival echo, and the virtual azimuth and the virtual power.

While an illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those skilled in the art, based on the present disclosure. The limitations in the claims are to be interpreted broadly based on the language employed in the claims and not limited to examples described in the present specification or during the prosecution of the application, which examples are to be construed as non-exclusive.

What is claimed is:

1. A radar device comprising:

a transceiver that:

transmits a radar wave, the radar wave being frequency modulated to have a frequency that increases in an up section over time and decreases in a down section over time, the up and down sections constituting one cycle of the radar wave; and receives, by receiving antennas, arrival echoes that are reflected radar waves;

a peak detecting unit that performs spectrum analysis on a beat signal, which is generated by mixing a received signal by each of the receiving antennas with a transmitted signal used for the transmission, in each of the up and down sections to extract frequency components each having a frequency peak as a result of the spectrum analysis;

an azimuth estimating unit that:

produces, for each of the frequency components during the up section and the frequency components during the down section detected by the peak detecting unit, an autocorrelation matrix of the received signals of the respective antennas;

estimates a number of the arrival echoes based on eigenvalues of the autocorrelation matrix; and estimates an arrival azimuth of each of the arrival echoes and arrival power indicative of power of each of the arrival echoes, thus producing azimuth information including these estimated results;

a pair matching unit that checks whether the azimuth information for each of the frequency peaks during the up section is matched with the azimuth information for each of the frequency peaks during the down section to thereby generate frequency pairs each comprised of one of the frequency peaks during the up section and one of the frequency peaks during the down section, the frequency pair meeting a predetermined condition;

a target information generating unit that:

calculates, based on the frequency pairs generated by the pair matching unit, a distance with respect to a target and a relative speed of the target, the target corresponding to each frequency pair and having reflected the radar wave;

determines the arrival azimuth of each of the arrival echoes as an azimuth of the target corresponding to each frequency pair; and generates, for each frequency pair, target information including at least: the distance with respect to the target, the relative speed of the target, and the azimuth of the target, wherein the estimating unit comprises a virtual azimuth obtaining unit, when an angular range between the arrival azimuths of adjacent two arrival echoes in the arrival echoes is equal to or smaller than a resolution, the virtual azimuth obtaining unit obtaining a virtual azimuth being within the arrival azimuths of the two arrival echoes, and obtaining virtual power representing arrival power of an arrival echo from the virtual azimuth, the resolution being previously defined based on characteristics of the receiving antennas, the virtual azimuth and the virtual power obtained by the virtual azimuth obtaining unit being included in the azimuth information.

2. The radar device according to claim 1, wherein the virtual azimuth obtaining unit obtains, as the virtual azimuth, a position of an intermediate point between the arrival azimuths of the adjacent two arrival echoes of the two targets.

3. The radar device according to claim 2, wherein the receiving antennas have a receive-beam pattern and the virtual azimuth obtaining unit obtains, as the virtual azimuth, power received by the transceiver when a receive-beam is oriented to the virtual azimuth.

4. The radar device according to claim 1, wherein the receiving antennas have a receive-beam pattern and the virtual azimuth obtaining unit obtains, as the virtual azimuth, power received by the transceiver when a receive-beam is oriented to the virtual azimuth.

* * * * *